Feb. 26, 1924.
F. C. REINEKING
1,485,293
PISTON RING
Filed Aug. 31, 1921
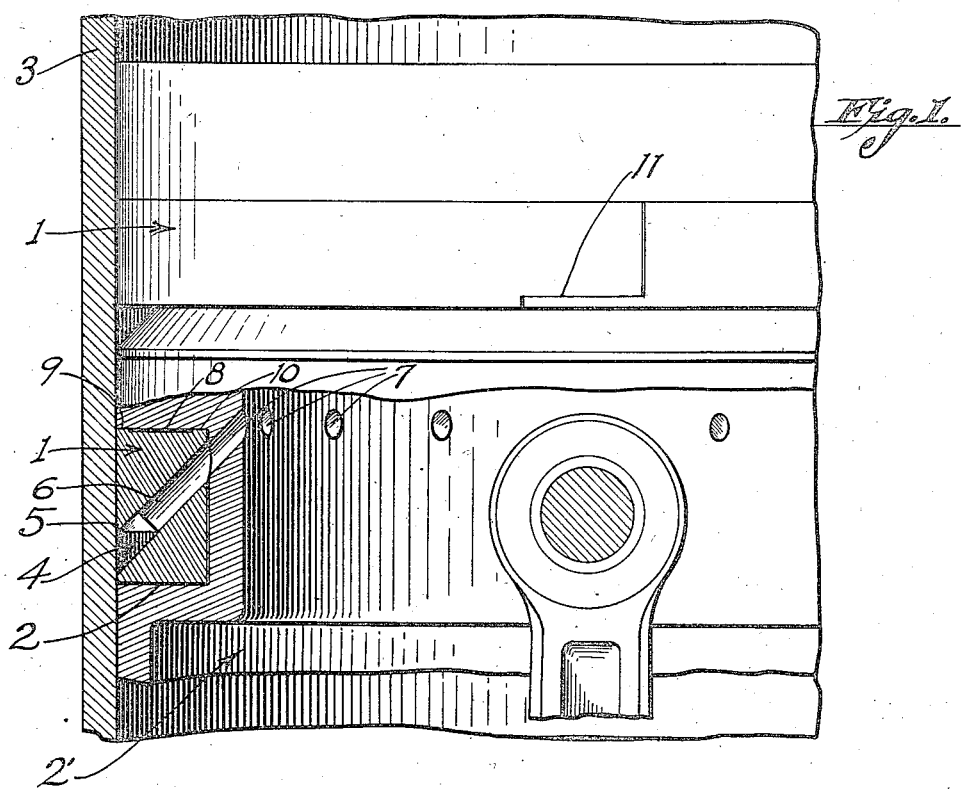
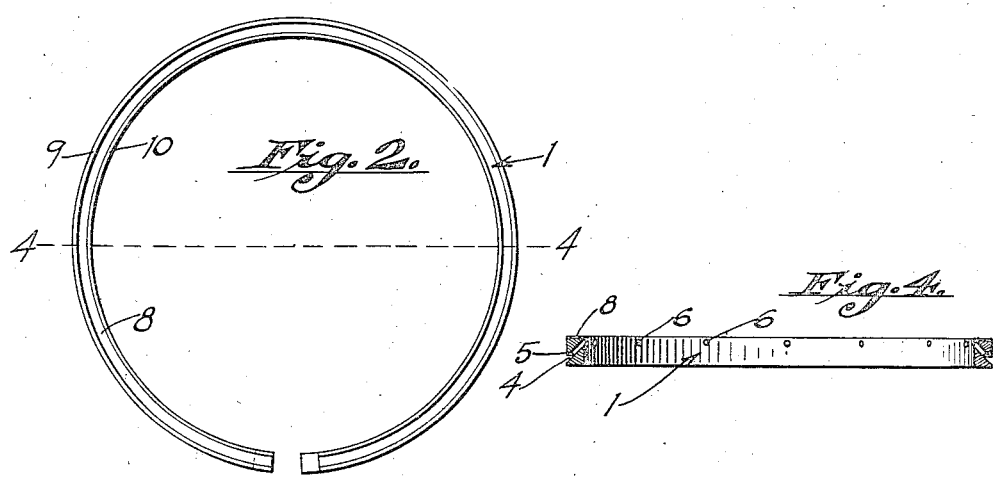
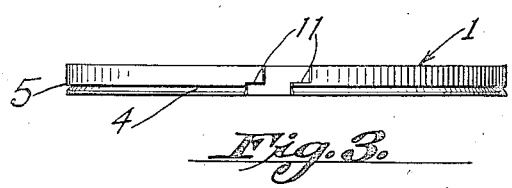
INVENTOR.
FREDERICK C. REINEKING.
BY Herman Miller
ATTORNEY.

Patented Feb. 26, 1924.

1,485,293

UNITED STATES PATENT OFFICE.

FREDERICK C. REINEKING, OF LOS ANGELES, CALIFORNIA, ASSIGNOR OF ONE-HALF TO RALPH G. ZELEDON, OF LOS ANGELES, CALIFORNIA.

PISTON RING.

Application filed August 31, 1921. Serial No. 497,331.

*To all whom it may concern:*

Be it known that I, FREDERICK C. REINEKING, a citizen of the United States, residing at Los Angeles, in the county of Los Angeles and State of California, have invented new and useful Improvements in Piston Rings, of which the following is a specification.

This invention relates to piston rings and has for its object to provide extremely simple and novel means by which any excess lubrication between the piston and cylinder walls will be caused to flow back into the crank case through the walls of the piston.

Another object is to have the novel means so arranged that the oil film will be allowed to flow through the piston walls with as little resistance as possible and this means is further arranged so that the oil film will only be removed on the down stroke of the piston.

A further object is to provide means for positively insuring a good seating surface between the upper side of the ring and the groove in the piston.

Other objects and advantages will be readily understood from the following description of the accompanying drawings in which: Fig. 1 is an enlarged fragmentary transverse section of a cylinder and piston showing my improved piston ring mounted therein.

Fig. 2 is a plan view of the ring.

Fig. 3 is a side elevation of the ring.

Fig. 4 is a section taken on line 4—4 of Fig. 2.

My improved piston ring 1 is shown as mounted in a piston ring groove 2 formed in any usual type of piston 2' adapted to be mounted in a cylinder 3 and any usual means can be used for providing a lubricating film between the cylinder wall and the piston and my improved ring is so constructed that it will remove any excess lubricating film to the crank case through the walls of the piston. To accomplish this purpose I have provided the ring 1 with an annular V-shaped groove 4 formed inwardly from the lower portion of the outer periphery of the ring, which provides a shearing edge 5 adapted to remove the excess oil from the walls of the cylinder. Extending inwardly and upwardly from the annular groove through the ring are a plurality of passage ways 6, the axis of which is substantially parallel to one side of the V-shaped groove. Thus it would be seen that as the piston is on its downward movement the oil will have a natural tendency to be thrown upwardly into the passage 6 and to allow this oil to be passed through the piston and into the crank case I provide a plurality of inwardly and upwardly extending apertures 7 being in axial alinement with the passages 6 so that as the oil is forced into the passages 6 it will be allowed to continue uninterruptedly through the apertures 7 and down to the crank case to be used over again.

The means provided for insuring the positive seating surface for the piston ring comprises an annular groove 8 formed in the top side of the piston ring and intermediate of the peripheries of the ring which forms annuli 9 and 10 the surface of which has contact with the upper side of the groove. It is obvious that by cutting out the inner portion of the ring it will be considerably easier to form a positive seating surface for the ring without the liability of having compression gases escape by the ring.

The usual offset overlapping end portions 11 are formed on the ends of the ring so as to insure that the gases and oil will not be allowed to leak by. With such a construction as I employ the contacting walls of the cylinder and piston are lubricated from within the piston on the up stroke of the same, as will be seen the oil being splashed within the piston by a crank shaft and other means would flow down the inclined passages to the walls.

Various changes in the details of construction of my invention may be made by those skilled in the art without departing from the spirit of the invention as set forth in the appended claims.

What is claimed is:

1. The combination with a cylinder, of a piston having a ring groove, a ring having an annular groove mounted in said ring groove, a plurality of passages extending upwardly and inwardly from said annular groove through the ring, apertures in axial alinement with said passages extending through said piston from said ring groove, said passages and apertures inclined so that oil will flow through the same from the walls of said cylinder.

2. The combination of a piston having a ring groove, a ring mounted in said groove, said ring having an annular groove and passages extending therefrom through said ring, apertures in said piston, said apertures and passages allowing communication from the outside of said piston to the inner side of the same and extending inwardly and upwardly.

3. The combination with a cylinder, of a piston having rings, and passageways formed in the piston and rings cooperating to permit lubrication of the cylinder and piston walls from within said piston through said rings on the up stroke of said piston.

4. A piston ring having an annular groove and passages extending inwardly and upwardly therefrom through said ring, said groove being inclined transversely and disposed in alignment with the passages.

In testimony whereof I have signed my name to this specification.

FREDERICK C. REINEKING.